(12) United States Patent
Willey et al.

(10) Patent No.: US 7,193,783 B2
(45) Date of Patent: Mar. 20, 2007

(54) MOUNTING/ADJUSTING MECHANISM FOR VISION ENHANCEMENT SYSTEM

(75) Inventors: Charles D. Willey, Roanoke, VA (US); Steven A. Brillhart, Bedford, VA (US); Blair R. Dobbie, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/889,478

(22) Filed: Jul. 12, 2004

(65) Prior Publication Data

US 2006/0007562 A1    Jan. 12, 2006

(51) Int. Cl.
G02B 27/14 (2006.01)
G02B 7/02 (2006.01)

(52) U.S. Cl. .................. 359/630; 359/811; 359/819; 359/821

(58) Field of Classification Search ................ 359/811, 359/813, 819, 821, 822, 631, 630
See application file for complete search history.

(56) References Cited

U.S. PATENT DOCUMENTS

| | | | |
|---|---|---|---|
| 4,449,787 A | 5/1984 | Burbo et al. | |
| 4,592,096 A | 6/1986 | Glasheen | |
| 4,670,912 A | 6/1987 | Hart | |
| 5,064,278 A | 11/1991 | Thomanek | |
| 5,092,552 A * | 3/1992 | Dayton et al. | 248/280.11 |
| 5,128,807 A | 7/1992 | Blackmon | |
| 5,179,735 A | 1/1993 | Thomanek | |
| 5,331,459 A | 7/1994 | Dor | |
| 5,381,263 A | 1/1995 | Nowak et al. | |
| 5,396,661 A | 3/1995 | Sutter et al. | |
| 5,535,053 A | 7/1996 | Baril et al. | |
| 5,581,806 A | 12/1996 | Capdepuy et al. | |
| 5,701,202 A | 12/1997 | Takahashi | |
| 5,786,932 A | 7/1998 | Pniel | |
| 6,378,390 B2 | 4/2002 | Saito | |
| 6,457,179 B1 | 10/2002 | Prendergast | |
| 6,462,867 B2 | 10/2002 | Choinere | |
| 6,462,894 B1 | 10/2002 | Moody | |

(Continued)

FOREIGN PATENT DOCUMENTS

EP    1 202 104 A1    5/2002

(Continued)

Primary Examiner—Alicia M. Harrington
Assistant Examiner—Brandi Thomas
(74) Attorney, Agent, or Firm—RatnerPrestia

(57) ABSTRACT

A mounting assembly for a vision enhancement device and associated vision enhancement display, the assembly comprising a display mounted to an arm positionable in front of the user's eye, a base member for receiving a cradle for the vision enhancement device and for attaching to a head-mounting platform, and one or more intermediate members for connecting the arm to the cradle. In one embodiment, the mounting system comprises one or more mechanisms for aligning the display optical axis with the vision enhancement device optical axis and with the user's line of sight, one or more mechanisms for orienting the vision enhancement device within multiple degrees of freedom without changing the alignment of the display optical axis with the device optical axis, and one or more mechanisms for toggling the display between an in-use position to at least one storage position, and, optionally, between right eye and left eye positions.

8 Claims, 9 Drawing Sheets

U.S. PATENT DOCUMENTS

| | | |
|---|---|---|
| 6,493,137 B1 | 12/2002 | Solinsky et al. |
| 6,515,853 B2 * | 2/2003 | Saito .......................... 361/681 |
| 6,538,624 B1 | 3/2003 | Karasawa et al. |
| 6,554,428 B2 | 4/2003 | Fergason et al. |
| 6,560,029 B1 * | 5/2003 | Dobbie et al. .............. 359/631 |
| 2003/0115661 A1 | 6/2003 | Dobbie et al. |
| 2003/0115662 A1 | 6/2003 | Dobbie et al. |

FOREIGN PATENT DOCUMENTS

| | | |
|---|---|---|
| EP | 1 202 566 A1 | 5/2002 |
| EP | 1 394 592 A1 | 3/2004 |
| WO | WO 00/55673 | 9/2000 |
| WO | WO 03/060590 A2 | 7/2003 |

\* cited by examiner

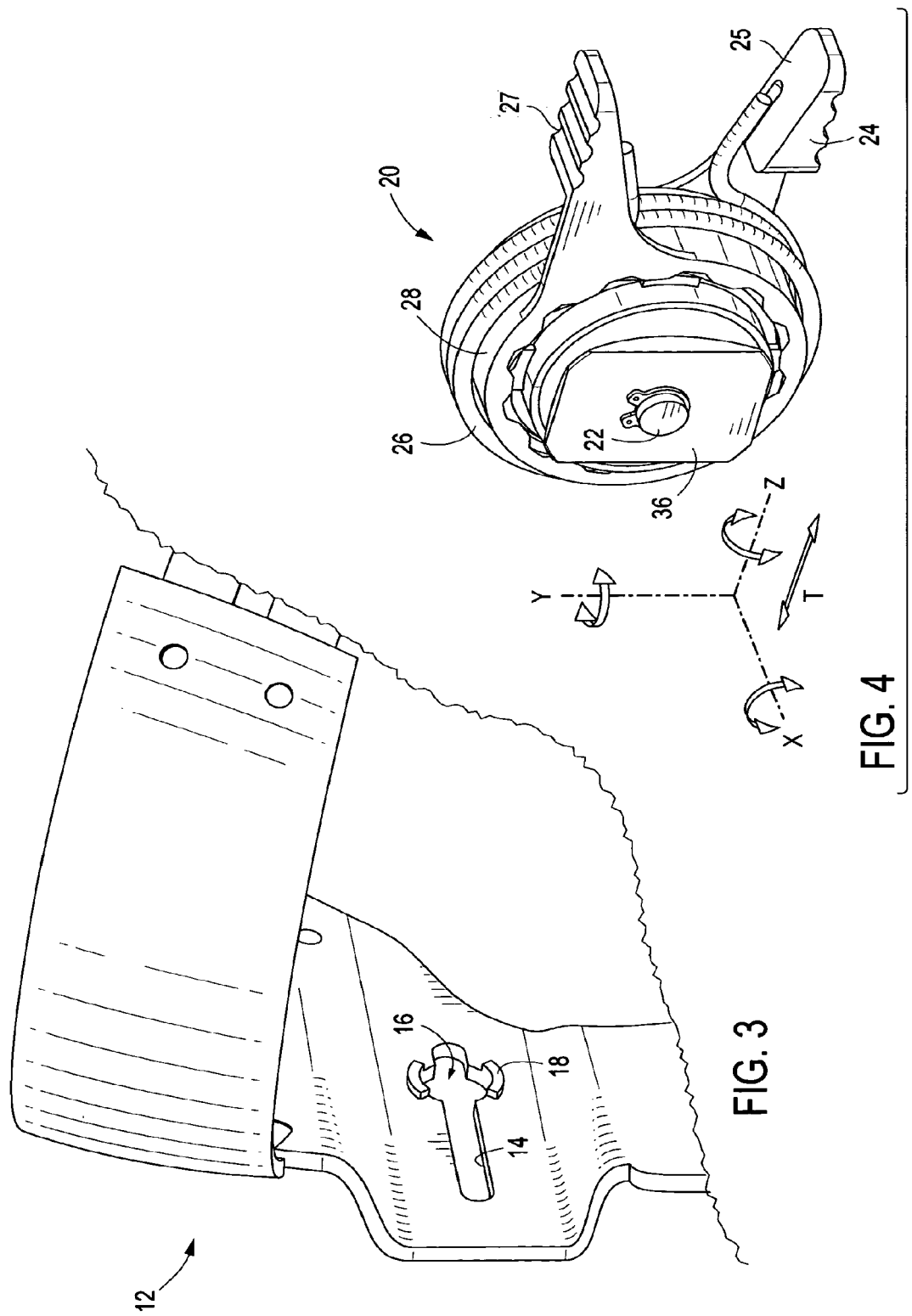

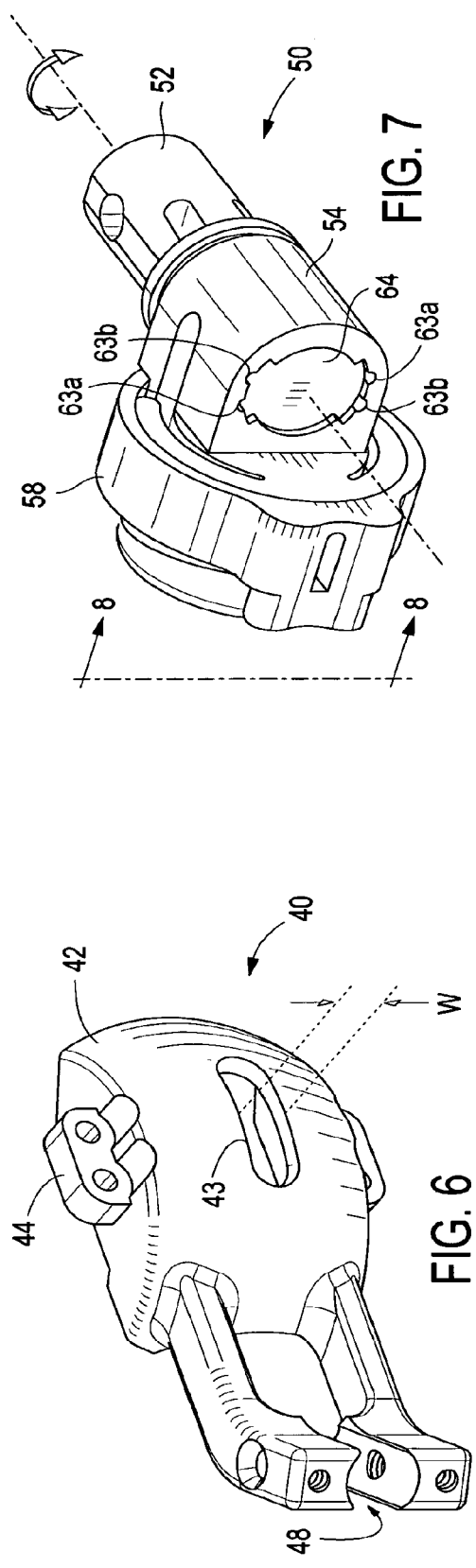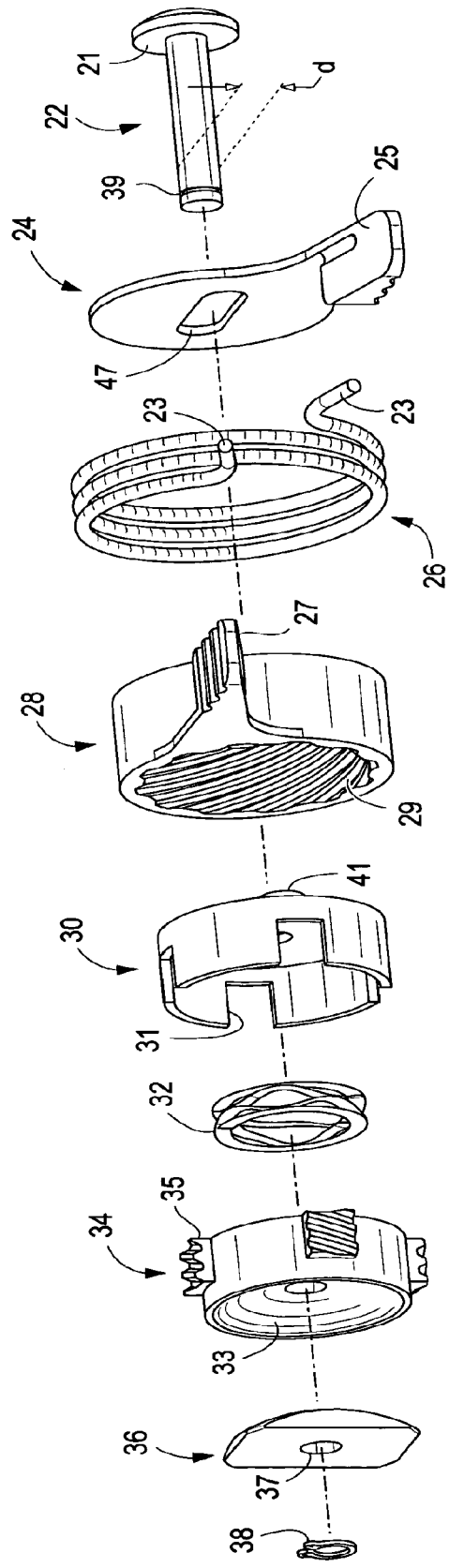

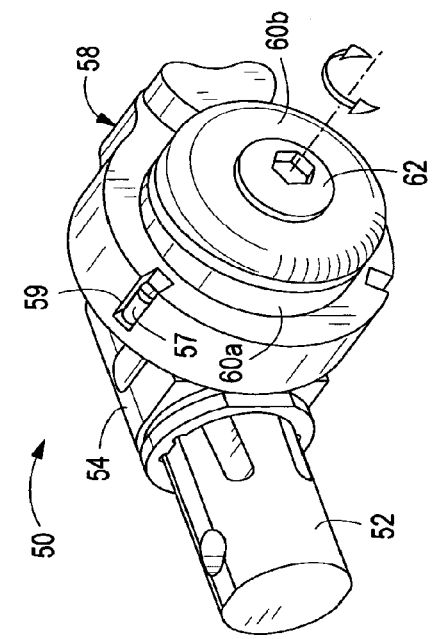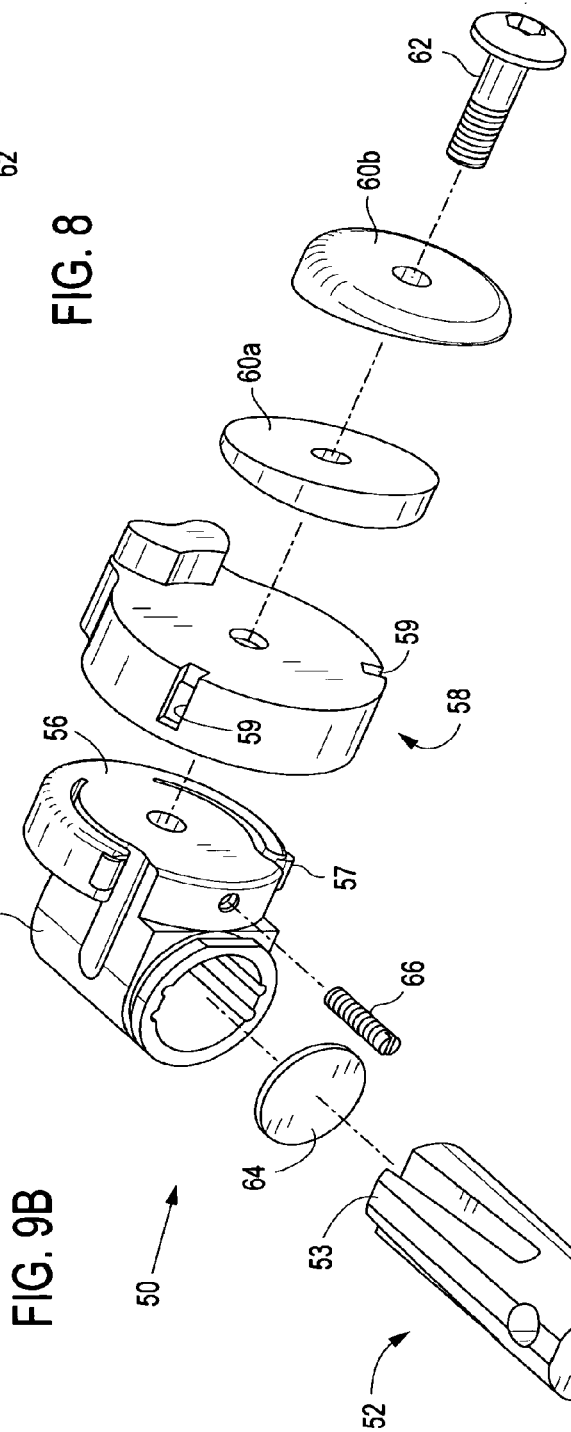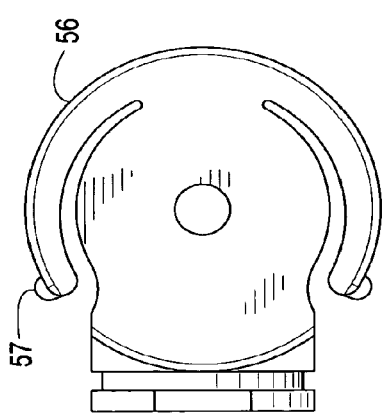

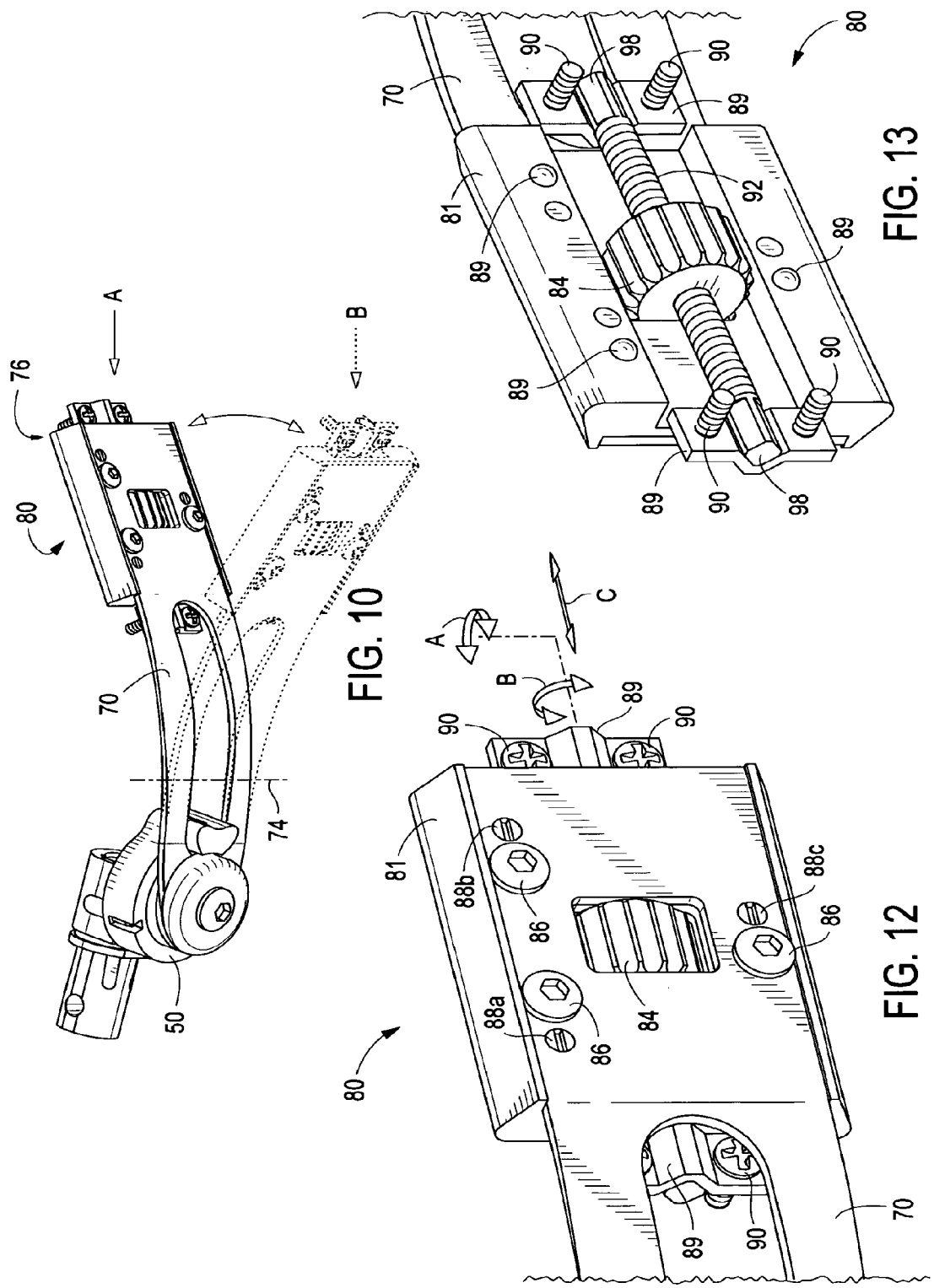

MOUNTING/ADJUSTING MECHANISM FOR VISION ENHANCEMENT SYSTEM

FIELD OF THE INVENTION

This invention relates to mounting/adjustment mechanisms for vision enhancement systems, particularly night vision systems, and more particularly video enhanced night vision systems.

BACKGROUND OF THE INVENTION

U.S. Pat. No. 6,560,029 to Dobbie et al., assigned to the common assignee of this invention, and incorporated herein by references, discloses a video enhanced night vision system comprising a head mount assembly, an image intensified video camera, and a display. Other pending applications, namely Ser. No. 10/024,436, published as U.S. Patent Application Publication No. US 2003/0115661, and Ser. No. 10/024,650, published as U.S. Patent Application Publication No. U.S. 2003/0115662, both of which also name Dobbie et al. as inventors, are assigned to the common assignee of this invention, and are incorporated herein by reference. These applications disclose a head mount apparatus and adjustment mechanisms for a head mount apparatus, respectively, for use with video enhanced night vision systems.

Other night vision devices and head-mounting systems are also known in the art. Conventional mounting mechanisms for affixing vision enhancing devices to headgear, such as helmets or head mounts, may be as simple as a clamp affixing a device to a welding helmet harness or as complex as assemblies having several degrees of freedom of adjustment to position the device in front of the eye or eyes.

Positioning adjustments are desirable because of anthropometric variability between users. For example, a device affixed in a permanent location on a particular headgear would only lie in the line of sight of a very small portion of the people in a given population. In order to accommodate anthropometric variation, some conventional mechanisms provide a forward tilt, a lateral slide, and a vertical adjustment. Additional features on some mounting mechanisms provide for the removal of the device and/or a flip-away or slide mechanism to allow storage of the device away from the line of sight when not in use. Conventional adjustment mechanisms often require the user to adjust each degree of freedom successively.

Ideally, as shown in FIG. 15, the optical axis of the vision enhancement device or camera $OA_C$ is parallel to the optical axis of the display $OA_D$ and the both of these optical axes are preferably parallel to the user's line of sight, which is essentially normal to the viewing plane VP. In particular, it is desirable for the user's line of sight through the user's display-viewing eye (LS) to align with the optical axis of the display $OA_D$. Most vision enhancement device mounting mechanisms, however, do not provide enough degrees of freedom to facilitate optical axes alignment (alignment of the vision enhancement device optical axis $OA_C$ to user line of sight LS) and have no provisions for adjusting parallelism between the display and sensor optical axes $OA_D$ and $OA_C$ or aligning the display optical axis with the user's line of sight through his or her display-viewing eye.

Furthermore, where multiple degrees of freedom of adjustment are available, the adjustment mechanisms may include a number of separate knobs or levers in locations on the mounting attachment that may be difficult to for the user to find and manipulate during use. Often, adjustments must be made iteratively, because the adjustment of one requires the repositioning of another. For example, tilting of optical systems may move the system optical axis out of the user's line of sight.

Thus, it is desirable to provide enhancements that improve upon previously designed systems by incorporating multiple degrees of freedom in a consolidated adjustment location, providing additional degrees of freedom for alignment of the sensor and display optical axes, and integrating at least some of the adjustment mechanisms to enable adjustment of at least some mechanisms without interference with other adjustment mechanisms. It is also desirable for the mounting system to enable one or more of the following: quick removal of system from mount, left/right side compatibility, quick manipulation of the device into a storage configuration, and one hand operation.

SUMMARY OF THE INVENTION

The invention generally comprises a mounting assembly for a vision enhancement device and an associated vision enhancement display. The mounting assembly comprises a display mount for holding the vision enhancement display; an arm extending from a fixed end to a free end positionable in front of an eye of a user and on which the display mount is mounted; a base member attached to a mounting platform to be worn on the user's head, the base member providing an anchorage point for a vision enhancement device cradle, and one or more intermediate members for connecting the arm to the vision enhancement device cradle.

In one embodiment, the mounting system comprises one or more mechanisms for aligning the display optical axis with the vision enhancement device optical axis and with the user's line-of-sight through his or her display-viewing eye, one or more mechanisms for orienting the vision enhancement device within multiple degrees of freedom without changing the alignment of the display line-of sight axis with the system line-of sight axis, and one or more mechanisms for toggling the display between an in-use position to at least one storage position.

For example, in one embodiment, the base member is rotationally adjustable on a vertical axis, a horizontal axis, and an optical axis of the vision enhancement device and is translatably adjustable front-to-back on the mounting platform.

In another embodiment, the intermediate members comprise an indexing joint to which the fixed end of the inverting arm is attached and a member for connecting the indexing joint to the device cradle. The indexing joint comprises at least one swivel having detents adapted to provide adjustment between an in-use position and one or more storage positions above or below the in-use position. The indexing joint may also comprise at least one swivel having detents adapted to provide adjustment between a plurality of positions including at least a right-eye in-use position and a left-eye in use position.

In yet another embodiment, the arm on which the display mount is mounted is invertible between the in-use position and a non-use position.

In still another embodiment, the display mount comprises a mechanism for translational adjustment side-to-side, one or more mechanisms for rotational adjustment along substantially horizontal and vertical axes, or a combination thereof.

Embodiments of the invention comprising any combination of the adjustable base member, indexing joint having swivels with detents, invertible arm, and adjustable display mount may be provided, including an embodiment having all of these features.

The base member may comprise a friction mechanism for holding the base member and device cradle in a desired position, in which the friction mechanism is releasable via single-handed manipulation of a release mechanism, such as a release mechanism comprising a pair of levers adapted to be squeezed together to cause release of the friction mechanism.

An exemplary vision enhancement device suitable for use with the invention includes, but is not limited to, an image intensified video camera for providing night vision.

BRIEF DESCRIPTION OF THE DRAWINGS

FIG. 3 is an inside view of the exemplary head mounted platform of FIG. 1, showing exemplary features for attaching the exemplary mounting system to the platform.

FIG. 4 is an isometric view of an exemplary friction base.

FIG. 5 is an exploded view of the friction base of FIG. 4.

FIG. 6 is an isometric view of an exemplary device cradle.

FIG. 7 is an isometric view of an exemplary indexing joint.

FIG. 8 is an isometric view of the indexing joint of FIG. 7 as viewed from line 8—8.

FIG. 9A is an exploded view of the indexing joint of FIGS. 7 and 8.

FIG. 9B is a front view of the circular detent spring.

FIG. 10 is an isometric view of an exemplary inverting arm showing the in-use position (A) and the pre-storage position (B).

FIG. 12 is an isometric illustration of one side of an exemplary display slide assembly.

FIG. 13 is an isometric illustration of the opposite side of display slide assembly of FIG. 12.

DETAILED DESCRIPTION OF THE INVENTION

Figure 1:
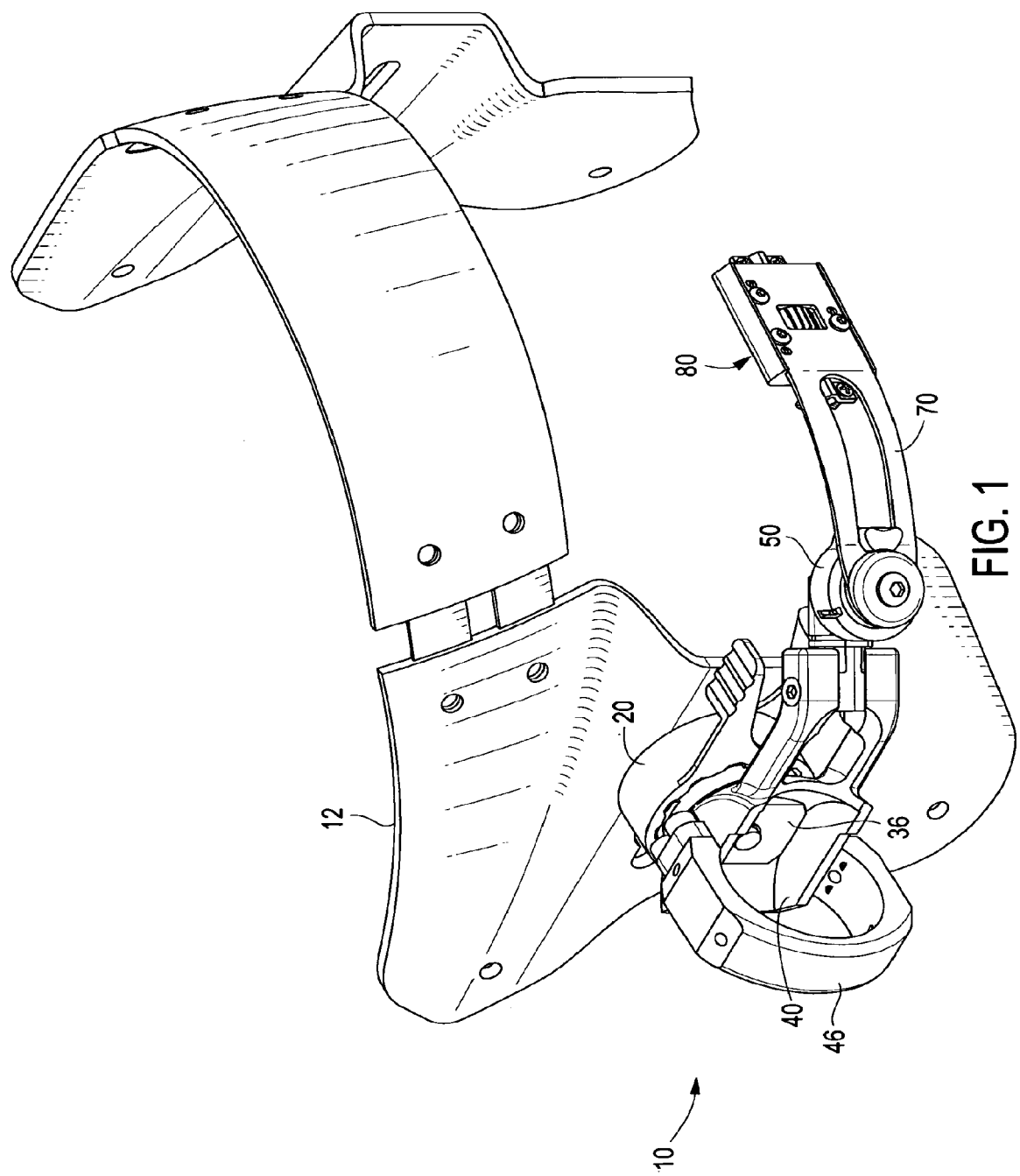
FIG. 1 is an isometric illustration of an exemplary device mounting system of the present invention attached to an exemplary head mounted platform.
Figure 2:
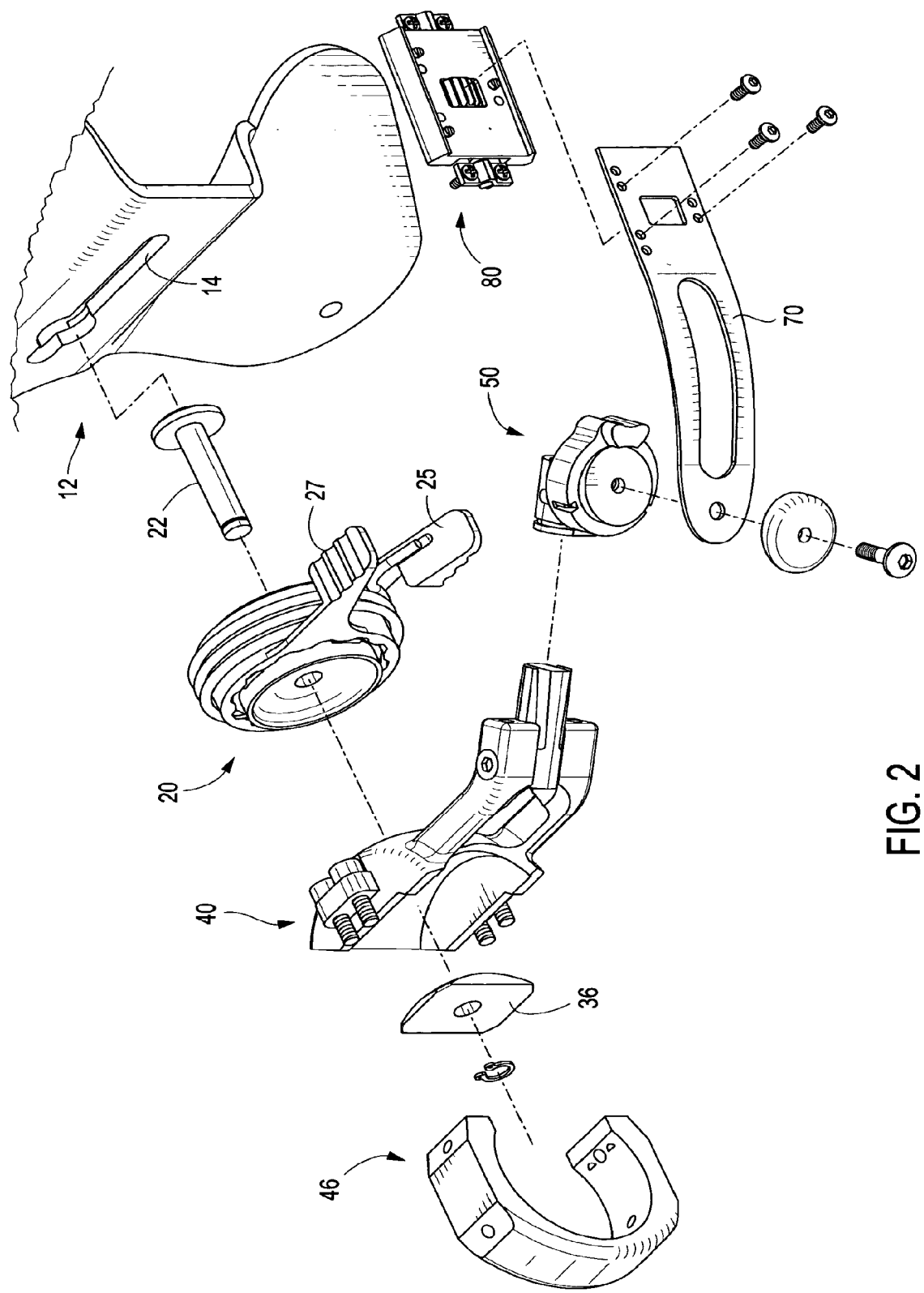
FIG. 2 is an exploded illustration of exemplary modules of the exemplary device mounting system of FIG. 1.

The invention will next be described with respect to exemplary embodiments shown in the figures. FIGS. 1 and 2 show an exemplary mounting system 10, which comprises several major components, each of which will be described in more detail below. These major components are head-mounted platform 12, shown in more detail in FIG. 3; friction base 20, shown in more detail in FIGS. 4 and 5; device cradle 40, shown in more detail in FIG. 6; indexing joint 50, shown in more detail in FIGS. 7–9B; inverting arm 70, shown in more detail in FIG. 10; and display slide assembly 80, shown in more detail in FIGS. 12–14.

Generally, head-mounted platform 12 provides a slot 14 and an insertion orifice 16 for mounting friction base 20. Slot 14 provides fore/aft translation of friction base 20 so the user may adjust eye relief. Friction base 20 is an expanding concave spherical nest that allows the user to adjust the position of the system. When opposing levers (thumb grips 25 and 27) are compressed toward one another, the friction base provides three rotational degrees of freedom as well as the translational degree of freedom as described above. When the user's grip on the levers is relaxed, the system is held in position via friction force imparted by a spring bias. Device cradle 40 holds the vision enhancement device (not shown), which may be any vision enhancement device known in the art, such as for example an image intensified video camera for providing night vision. Indexing joint 50 allows two rotational degrees of freedom for moving display module 82 between in-use and storage positions (shown in FIGS. 11A–11D). One of the degrees of freedom allows the user to select an oblique angle for left/right eye compatibility. The other degree of freedom rotates through three positions with detents: two positions for storage in which the display is in an upper or lower position and one for use in which the display is front of the eye. Inverting arm 70 enables the user to snap the display away from the eye prior to rotating it to the storage position. Display slide assembly 80 permits horizontal translation of the display to accommodate for anthropometric variation in the distance between the temporal region and the line of sight. Jacking screws on the slide are used for aligning the optical axis of the display to the optical axis of the vision enhancement device. Each component will now be discussed in further detail.

As shown in FIG. 3, head-mounted platform 12 comprises a mounting surface located adjacent one side of a user's face with a slot 14 wide enough to accommodate a mounting post 22 (shown in FIG. 5) that affixes friction base 20 to the platform, but narrow enough to retain flat head 21 of post 22. Insertion orifice 16 is sized to receive flat head 21 for affixation or removal of friction base 20 to platform 12. Slot 14 is long enough, typically about one or more inches, to provide the desired eye relief (distance from the eye to the display) adjustment. The inside surface of platform 12 may also have a feature 18 that protrudes in proximity to insertion orifice 16 to help prevent unintentional detachment of the friction base 20. The protruding feature 18 requires the user to compress friction base 20 against platform 12 in order for head 21 of mounting post 22 to clear the protrusion, making unintentional disengagement unlikely.

Friction base 20, as shown in FIGS. 4 and 5, is a spring-loaded nest that collapses when actuated by the user. By squeezing thumb grips 25 and 27 together, the user can single-handedly release the spring-biased clamping force that prevents motion, and is then able to move the device cradle 40 in four degrees of freedom using the same hand: rotational movement along horizontal axis X, vertical axis Y, and optical axis Z, and translational movement along axis T, shown in FIG. 4. After positioning the system as desired, the user then secures the device in the desired position by relaxing the thumb grips.

Each of the components of the friction base will now be described starting from the mounting platform and working outward. All of the components are mounted on mounting post 22, with the flat head 21 of post 22 being mounted inside of slot 14 on platform 12. Stationary grip 24, comprising a flat circular body with a central hole for axially receiving the mounting post, is mounted closest to the outside surface of platform 12. Actuating nut 28 comprises a cylindrical body with internal threads 29. Torsion spring 26 is coiled coaxially about actuating nut 28. Stationary grip 24 has a first thumb grip lever 25 and actuating nut 28 has a second thumb grip lever 27. The thumb grips interface with the radial protrusions 23 of torsion spring 26 such that torsion spring 26 provides the activation load to the system.

Nested inside the cylindrical body of actuating nut 28 are translation collar 30, wave spring 32, and friction cup 34. Friction cup 34 has a plurality of externally threaded regions 35 which protrude through openings 31 in translation collar 30 and interface with internal threads 29. Translation collar 30 is rotationally fixed with respect to stationary grip 24 via non-circular extension 41 that mates with non-circular slot 47. The rotational fixation of translation collar 30 causes the rotational motion of actuating nut 28 to be translated into axial motion of friction cup 34 which is constrained from rotational motion by the protrusion of the threaded regions 35 through openings 31, but is free to move axially. Wave spring 32 applies a continuous load between friction cup 34 and translation collar 30 thereby maintaining the interface between non-circular extension 41 and non-circular slot 47.

Friction cup 34 has a concave spherical inside surface 33 into which spherical shell 42 of device cradle 40 (shown in FIG. 6) rests, creating a ball-in-socket joint. The device cradle 40 is secured in place by spherical washer 36, which has a spherical, convex outer surface for mating with the spherical, concave inner surface of cradle 40. Snap ring 38, which has a greater diameter than mounting hole 37 of washer 36, fits in groove 39 of mounting post 22, axially constraining spherical washer, thereby holding all of the components together on mounting post 22.

At rest, radial protrusions 23 of torsion spring 26 urge thumb grips 27 and 25 apart from one another until spherical surface 33 of friction cup 34 applies a friction load against spherical surface 42 of device cradle 40, which is held in place by spherical washer 36 and ultimately snap ring 38 in groove 39 of post 22. The frictional engagement of device cradle 42 against friction cup 34 prevents motion of the device cradle relative to the friction base assembly 20. When the user compresses thumb grips 25 and 27 toward each other against the spring bias of torsion spring 26, the internal threads 29 of actuating nut 28 interface with the external threaded regions 35 of friction cup 35 to pull the cup inward toward head-mounted platform 12, releasing the normal force exerted on the device cradle 40 and the snap ring 38, thereby decreasing the frictional resistance between inner surface 33 of cup 34 and device cradle 40, as well as decreasing the frictional resistance between mounting post head 21 and the inner surface of mounting platform 12. The decreased frictional resistance force allows the user to rotate the position of the cradle in the friction base along the X, Y, and Z axes and to translate the position of the friction base relative to the mounting platform along the T axis. The degree of rotation along the Z axis is set by the amount that the width (W) of slot 43 in device cradle 40 is greater than the diameter (d) of mounting post 22.

As shown in FIG. 6, device cradle 40 comprises a bolt fixture 44 for attaching retention clamp 46 (shown in FIGS. 1 and 2), which holds vision enhancement device (not shown) in place on the cradle. The device cradle 40 shown in FIG. 6 is suitable for receiving an image intensified camera module, such as is shown and described in U.S. Pat. No. 6,560,029, incorporated herein by reference, but may be dimensioned to receive any type of vision enhancement device known in the art. Cradle 40 also comprises a receptacle 48 for cylindrical detent spring 52 of indexing joint 50, shown in FIG. 7.

Indexing joint 50, as shown in FIGS. 7–9B, includes two separate swivels with detents. By "swivels with detents" it is meant that the swivels have catches that stop or release movement in selected positions, creating two or more rest positions between which the swivel can be toggled. The term "toggle" as used herein means to alternate between two or more preset mechanical options.

Figure 11A:
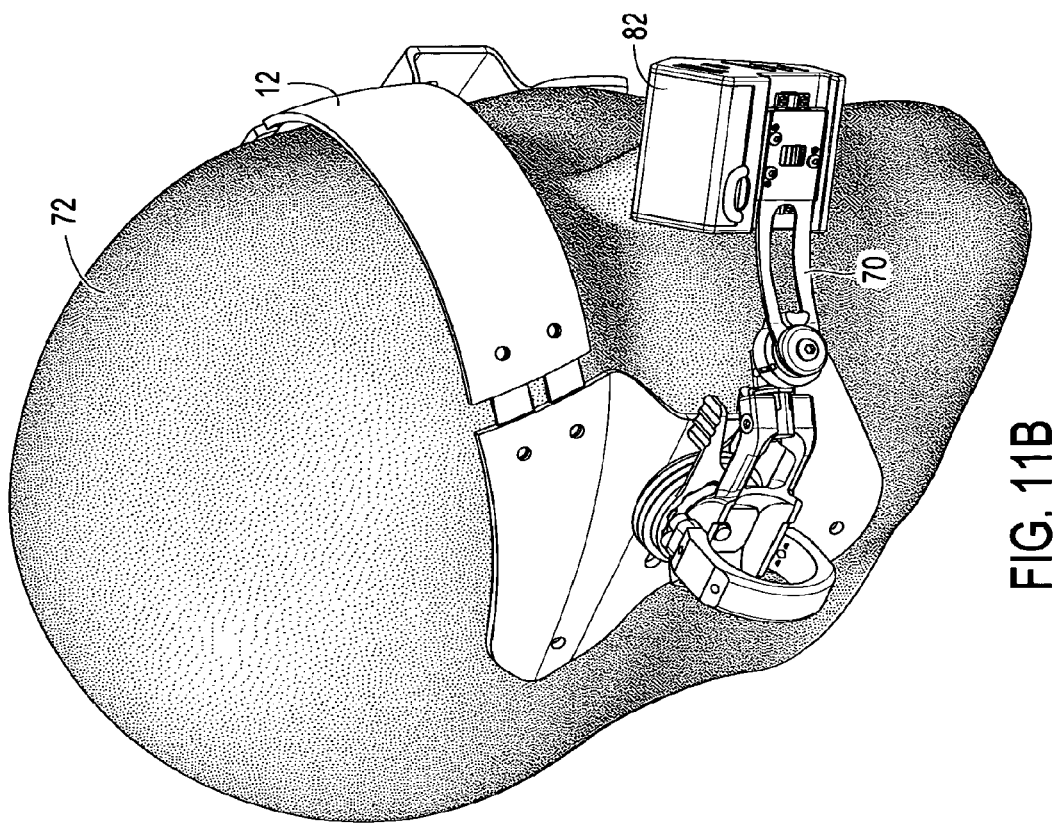
FIG. 11A is an illustration of the exemplary system of FIG. 1 with an attached display in an in-use position.
Figure 11B:
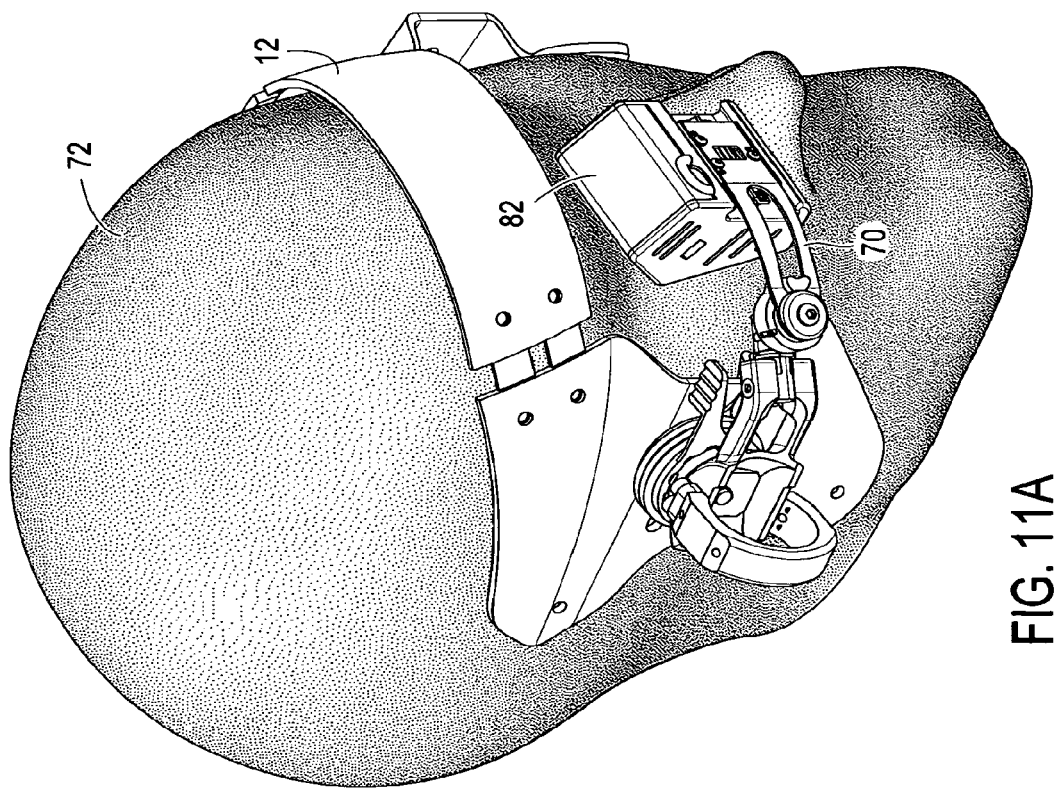
FIG. 11B is an illustration of the system of FIG. 11A in an intermediate position before storage.
Figure 11D:
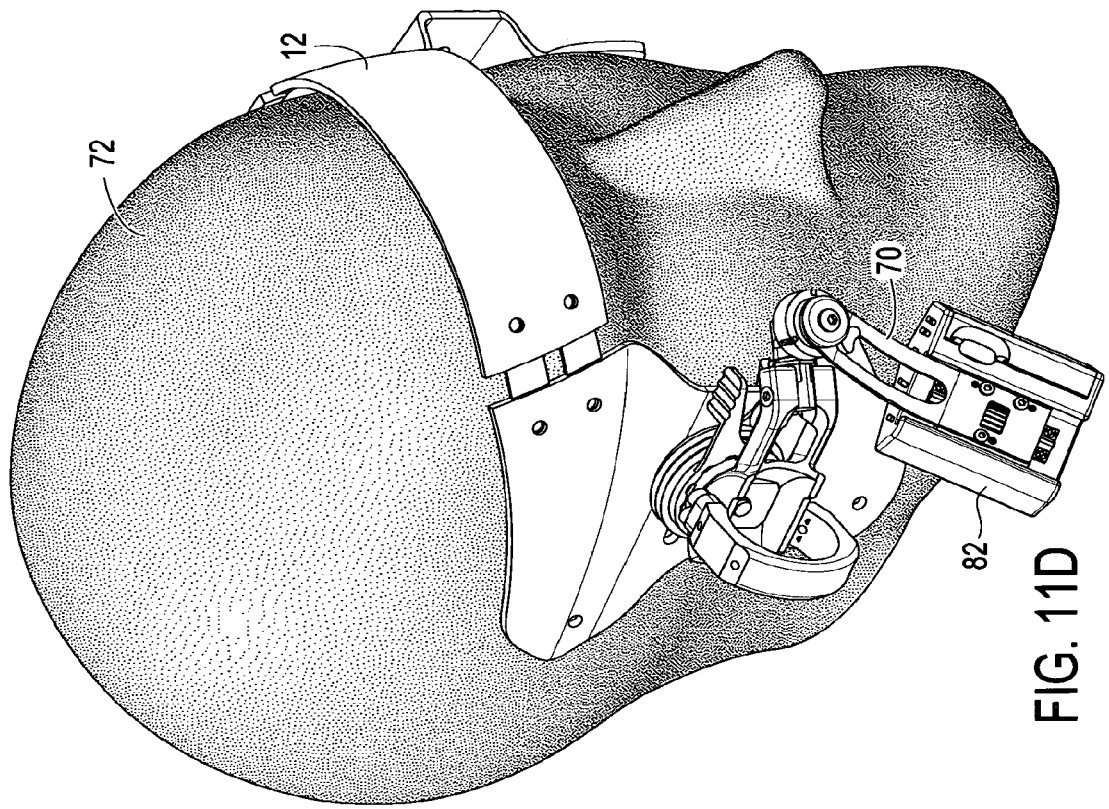
FIG. 11D is an illustration of the system of FIG. 11A in a lower storage position.
Figure 11C:
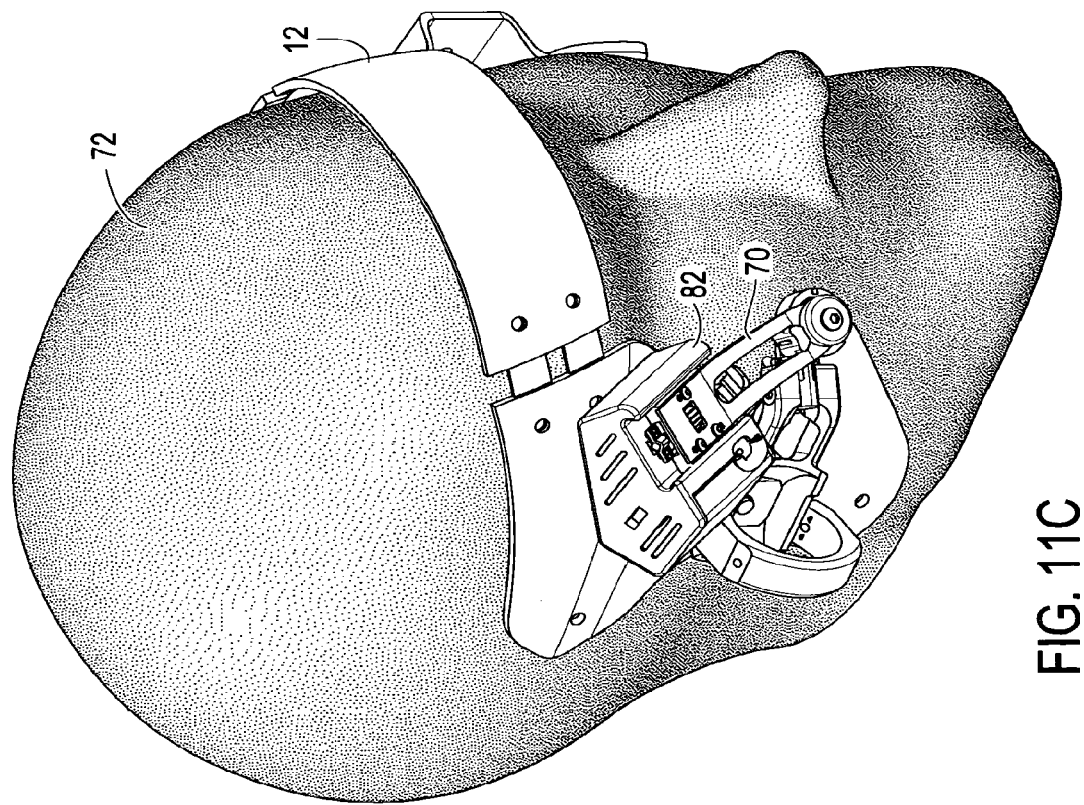
FIG. 11C is an illustration of the system of FIG. 11A in an upper storage position.
Figure 15:
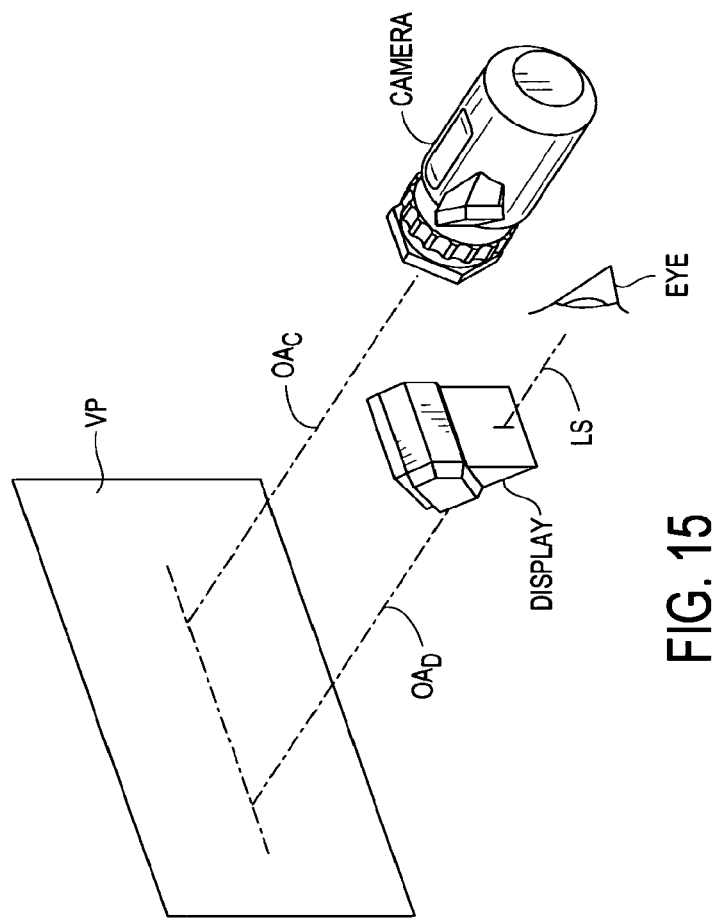
FIG. 15 is an illustration of the optical axes of the display and camera and the viewing plane and display-viewing eye line-of-sight of the user.

A first swivel, comprising the interface between cylindrical detent spring 52 and indexing joint body 54, allows the user to toggle between two different fold-away rotational planes, shown in FIGS. 11C and 11D. In a one plane, the display in a storage position lies close to the temporal region in an upper storage position shown in FIG. 1C. In another plane, the display in a storage position lies close to the cheek in a lower storage position shown in FIG. 11D.

Cylindrical detent spring 52 comprises a plurality of prongs 53 that may be compressed together to fit within indexing joint body 54 and thus exert a radial outward force that causes the prongs to catch in sets of grooves 63a or 63b in body 54 as the spring is rotated. The catch is sufficient to hold spring 52 in position without external force being applied, but user force twisting the spring will overcome the catch and allow the spring to continue rotating. Dust cap 64 keeps the mechanism from becoming clogged with debris, such as blowing sand, for example, in harsh environments. Sets of grooves such as 63a and 63b may be placed anywhere around the circumference of indexing joint body 54, and any number of groove sets may be provided, to attain desired positioning.

This interface between cylindrical detent spring 52 and indexing joint body 54 also provides left/right eye system compatibility. Thus, although system 10 is shown with the friction base 20 and attached assembly attached on the right side of head mounted platform 12, the friction base and assembly can also be mounted on the left side of head mounted platform 12, which is a mirror image of the side shown in FIG. 3. When mounted on the right side, cylindrical detent spring 52 is positioned in grooves 63a in the in-use position and in the lower storage position shown in FIG. 11D, and in grooves 63b when in the upper storage position shown in FIG. 1C. When mounted on the left side, however, the indexing joint is inverted relative to the right side, and spring 52 is positioned in grooves 63b in the in-use position and lower storage position, and in grooves 63a in the upper storage position.

A second swivel, comprising the interface between circular detent spring 56 and indexing hub 58, has three detents to allow toggling among an in-use position shown in FIGS. 11A and 11B, the upper storage position shown in FIG. 1C, and the lower storage position shown in FIG. 11D. Circular detent spring 56 has radial protrusions 57, best shown in FIG. 9B, that lodge in slots 59 of indexing hub 58 as the hub is rotated to provide the desired catch and release operability. Inverting arm 70 (shown in FIG. 10) attaches to indexing joint 50 between angled washers 60a and 60b and is held in place by pin 62. Set screw 66 locks pin 62 into place within the body of indexing joint 50.

Inverting arm 70 is preferably a stressed sheet metal part that attaches to the display slide assembly 80 and extends to the front of the user's face. The in-use position is indicated by configuration A shown in FIG. 10 and as shown in FIG. 11A. Arm 70 can be inverted along inversion line 74 such that when display module 82 (shown in FIGS. 11A–11D) is pulled away from the eye, arm 70 snaps into an inverted configuration B shown in FIG. 10, putting the display in an intermediate position shown in FIG. 11B from which the user can rotate the arm into the upper and lower storage positions shown in FIGS. 11C and 11D, respectively. The portion of the arm between inversion line 74 and the free end 76 of the arm may have a curvature similar to that of a section of a sphere.

Figure 14:
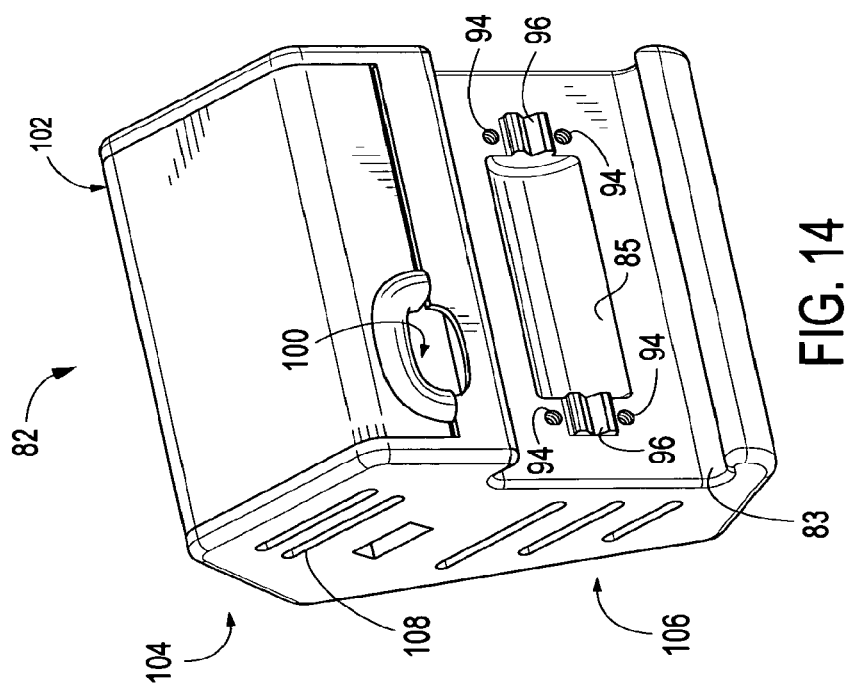
FIG. 14 is an isometric illustration of an exemplary display for affixing to the display slide assembly.

Display slide assembly 80, shown in FIGS. 12–14, provides two system adjustments: a horizontal translation of the display to accommodate anthropomorphic variance in the distance from the line of sight for the user's display viewing eye to the side of the user's face, and minor tilt adjustments on two planes for alignment of the display optical axis to the device optical axis. Slide mount 81 is fastened to arm 70 via fastening screws 86. Display module 82 attaches to the slide platforms 89 with attachment screws 90. Slide platform 89 has a central, externally threaded rod 92 that fits within the internally threaded center hole of translating nut 84.

An exemplary display module 82 is shown in FIG. 14. The internal components of the display module are not essential to this invention, and therefore the display module may comprise any type of display module known in the art. In one embodiment, however, display module 82 may comprise a flat panel display (not shown), such as is disclosed in U.S. Pat. No. 6,560,029, already incorporated by reference, and a prismatic eyepiece, further disclosed in U.S. Pat. No. 5,701,202, also incorporated herein by reference. As depicted in FIG. 14, the display module may comprise a housing 102 in which the display (not shown) is mounted in an upper portion 104 of the module and the prism is mounted in a lower portion of the module 106. The module may comprise vents 108 or louvers (not shown) for heat dissipation. Socket 100 is adapted to receive a cable for transmission of information from the vision enhancement device. Wireless transmission devices may also be used.

Display module 82 comprises a female dovetailed groove 83 on its rear into which the male dovetailed slide mount 81 fits to create an assembly best depicted in FIG. 11B. The rear of display module 82 also comprises a recess 85 inside groove 83 for receiving translating nut 84, holes 94 for receiving screws 90, and a recesses 96 for receiving the non-round cross-sectional portions 98 of rod 92. When assembled in FIG. 11B, translating nut 84 and rod 92 are sandwiched between slide mount 81 and display module 82, with display module 82 affixed to the slide platforms 89 with screws 90.

Turning translating nut 84 provides lateral adjustment along axis C by laterally moving rod 92, which is prevented from rotation by the interface of the non-round cross-sectional portions 98 with recesses 96 and mating sections of the slide platforms. Jacking screws 88a, 88b, and 88c can be adjusted to provided fine rotation along axes A and B, by changing the distance that the semi-spherical ends 89 protrude from the back of slide mount 81. The semi-spherical ends 89 abut the back side of display module 82, thereby defining the plane in which display module 82 is mounted. The depth of groove 83 within the rear of display module 82 into which slide mount 81 fits is slightly larger than the thickness of the slide mount, creating play that allows the desired amount of adjustment to be made using the jacking screws.

The system described herein may be used for head mounting vision enhancing devices for use in any type of application by any type of personnel who may need a vision enhancement device, including but not limited to military and aviation applications, law enforcement applications, navigational applications, maintenance applications, sporting applications, medical applications, or virtual reality entertainment or training applications.

The term "vision enhancement device" encompasses any type of device capable of capturing an image and transmitting, via wires or wirelessly, the image to be displayed on the display screen, whether that image itself is actually "enhanced" in any way, or not, relative to the image available to the naked eye. In some embodiments, the vision enhancement device may comprise a device capable of providing night vision capabilities, such as for aviation, combat, and sporting applications, while in other embodiments, the vision enhancement device may provide enlargement of an area being worked upon, such as for medical, manufacturing, or maintenance applications. The display may also or instead provide additional information, such as navigational information, or simulated images projected onto the actual landscape, such as for virtual reality training and entertainment applications. In some embodiments, the vision enhancement device may provide a view identical to that seen by the naked eye, wherein the "enhancement" comprises only additional information posted on the screen.

One advantage of the system described herein is that the alignment between the axes of the vision enhancement device and the display can be fine tuned one time by the user via the adjustments on the display slide assembly, and thereafter, the orientation of the vision enhancement device optical axis can adjusted with a single hand without disrupting the alignment between the vision enhancement device axis and the display axis. The display can also be toggled between one or more storage positions and the in-use position without disrupting the alignment between the vision enhancement device axis and the display axis.

Although one embodiment is described that comprises mechanisms for aligning the display optical axis with the vision enhancement device optical axis, mechanisms for orienting the vision enhancement device within multiple degrees of freedom without changing the alignment of the display optical axis with the vision enhancement device optical axis, and mechanisms for toggling the display between an in-use position to at least one storage position, other embodiments may be provided with fewer than all of these mechanisms, or additional mechanisms.

Although shown in a preferred embodiment in which specific mechanisms provide the functionality described above, the invention is not limited to any particular mechanisms or locations for those mechanisms. For example, although the fine adjustments for aligning the display with the device optical axis are shown mounted on the display slide assembly, and are shown in the form of a translating nut and a set of jacking screws, the fine adjustments may be located elsewhere in the system and may comprise any mechanism known in the art for accommodating adjustment along the axes shown, or in fewer or more axes. Similarly, although the indexing joint as discussed herein comprises two swivel mechanisms with spring/detent interfaces to provide the capability for toggling between in-use and storage positions, more or fewer swivel mechanisms and/or more or fewer selectable positions may be provided, and/or spring/detent mechanisms having a different construction than those depicted herein and/or mechanisms other than spring/detent interfaces may be provided. Likewise, although a translatable ball-in-socket assembly is described herein for providing single-handed adjustability of the vision enhancement device with four degrees of freedom, more or fewer degrees of freedom may be provided as may other types of assemblies.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A mounting assembly for a vision enhancement device and associated vision enhancement display, the assembly comprising:
   a) a display mount for holding the vision enhancement display;
   b) an arm extending from a fixed end to a free end positionable in front of an eye of a user and on which the display mount is mounted;
   c) a base member attached to a mounting platform to be worn on the user's head, the base member providing an anchorage point for a vision enhancement device cradle that is rotationally adjustable on a vertical axis, a horizontal axis, and an optical axis of the vision enhancement device, the base member translatably adjustable front-to-back on the mounting platform; and
   d) one or more intermediate members for connecting the arm to the vision enhancement device cradle,
   wherein the base member comprises a friction mechanism for holding the base member and device cradle in a desired position, the friction mechanism releasable via single-handed manipulation of a release mechanism, and
   wherein the base member is attached to the mounting platform via a mounting post, the mounting platform comprising a front-to-back slot in which the base member is adapted to travel for front-to-back translatable adjustment, the base member spring-loaded against the mounting platform with a friction mechanism that frictionally holds the base member in place until the friction mechanism is released.

2. A mounting assembly for a vision enhancement device and associated vision enhancement display, the assembly comprising:
   a) a display mount for holding the vision enhancement display;
   b) an arm extending from a fixed end to a free end positionable in front of an eye of a user and on which the display mount is mounted;
   c) a base member attached to a mounting platform to be worn on the user's head, the base member providing an anchorage point for a vision enhancement device cradle that is rotationally adjustable on a vertical axis, a horizontal axis, and an optical axis of the vision enhancement device, the base member translatably adjustable front-to-back on the mounting platform; and
   d) one or more intermediate members for connecting the arm to the vision enhancement device cradle,
   wherein the base member comprises a friction mechanism for holding the base member and device cradle in a desired position, the friction mechanism releasable via single-handed manipulation of a release mechanism, and
   wherein the base member and vision enhancement device cradle comprise:
   a mounting post having one free end and one end retained by the mounting platform, and;
   a stationary grip adjacent an external surface of the mounting platform comprising a flat body for axially receiving the mounting post and having a first lever extending substantially tangentially from the stationary grip body;
   an actuating nut comprising an internally-threaded, cylindrical body coaxial with the mounting post and having a second lever extending substantially tangentially from the actuating nut body;
   a torsion spring coaxial with the actuating nut and having a first protruding end aligned adjacent the first lever and a second protruding end aligned adjacent the second lever for biasing the first lever apart from the second lever;
   a translation collar axially mounted on the mounting post and nested within the actuating nut, the translation collar comprising a cup having a cylindrical wall with a plurality of slots, the translation collar rotationally fixed with respect to the stationary grip;
   a friction cup axially mounted on the mounting post and nested within the translation collar, the friction cup comprising a plurality of externally threaded radial protrusions extending through the slots in the translation collar for mating with the internal threads of the actuating nut for converting rotational movement of the actuating nut into axial movement of the friction cup, the friction cup having a concave internal surface in the shape of a partial sphere;
   a wave spring coiled coaxially with the mounting post between the translation collar and the friction cup for axially biasing the translation collar against the stationary grip;
   the vision enhancement device cradle having a partially spherical shell for interfacing with the internal surface of the friction cup, the spherical shell having a slot for accepting the mounting post, the slot having a length sufficient to allow rotational adjustment of the cradle along a substantially vertical axis and having a width sufficiently greater than a diameter of the mounting post to allow rotational adjustment along an optical axis of the vision enhancement device; and
   a spherical washer axially mounted on the mounting post and having a partially spherical, convex surface for mating with an internal surface of the device cradle, the spherical washer constrained from axial movement toward the free end of the mounting post.

3. A mounting assembly for a vision enhancement device, the assembly comprising:
   a) a display mount for holding a vision enhancement display, the display mount comprising a mechanism for translational adjustment side-to-side, one or more mechanisms for rotational adjustment along substantially horizontal and vertical axes, or a combination thereof;
   b) an arm extending from a fixed end to a free end positionable in front of an eye of a user in an in-use position;
   c) one or more intermediate members for connecting the arm to a mounting platform for wearing on the user's head, wherein the mechanism for translational adjustment side-to-side comprises a translating nut that converts rotation of the nut into translation of the slide.

4. A mounting assembly for a vision enhancement device, the assembly comprising:
   a) a display mount for holding a vision enhancement display, the display mount comprising a mechanism for translational adjustment side-to-side, one or more mechanisms for rotational adjustment along substantially horizontal and vertical axes, or a combination thereof;
b) an arm extending from a fixed end to a free end positionable in front of an eye of a user in an in-use position;
c) one or more intermediate members for connecting the arm to a mounting platform for wearing on the user's head, wherein the mechanisms for rotational adjustment along the substantially horizontal and vertical axes comprises a set of at least three adjustable jacking screws.

5. A mounting assembly for a vision enhancement device, the assembly comprising a base member attached to a mounting platform to be worn on the user's head, the base member providing an anchorage point for a vision enhancement device cradle that is rotationally adjustable on a vertical axis, a horizontal axis, and an optical axis of the vision enhancement device, the base member translatably adjustable front-to-back on the mounting platform, wherein the base member is attached to the mounting platform via a mounting post, the mounting platform comprising a front-to-back slot in which the base member is adapted to travel for front-to-back translatable adjustment, the base member spring-loaded against the mounting platform with a friction mechanism that frictionally holds the base member in place until the friction mechanism is released.

6. A mounting assembly for a vision enhancement device, the assembly comprising a base member attached to a mounting platform to be worn on the user's head, the base member providing an anchorage point for a vision enhancement device cradle that is rotationally adjustable on a vertical axis, a horizontal axis, and an optical axis of the vision enhancement device, the base member translatably adjustable front-to-back on the mounting platform, wherein the base member and vision enhancement device cradle comprise:
  a mounting post having one free end and one end retained by the mounting platform, and;
  a stationary grip adjacent an external surface of the mounting platform comprising a flat body for axially receiving the mounting post and having a first lever extending substantially tangentially from the stationary grip body;
  an actuating nut comprising an internally-threaded, cylindrical body coaxial with the mounting post and having a second lever extending substantially tangentially from the actuating nut body;
  a torsion spring coaxial with the actuating nut and having a first protruding end aligned adjacent the first lever and a second protruding end aligned adjacent the second lever for biasing the first lever apart from the second lever;
  a translation collar axially mounted on the mounting post and nested within the actuating nut, the translation collar comprising a cup having a cylindrical wall with a plurality of slots, the translation collar rotationally fixed with respect to the stationary grip;
  a friction cup axially mounted on the mounting post and nested within the translation collar, the friction cup comprising a plurality of externally threaded radial protrusions extending through the slots in the translation collar for mating with the internal threads of the actuating nut for converting rotational movement of the actuating nut into axial movement of the friction cup, the friction cup having a concave internal surface in the shape of a partial sphere;
  a wave spring coiled coaxially with the mounting post between the translation collar and the friction cup for axially biasing the translation collar against the stationary grip;
  the vision enhancement device cradle having a partially spherical shell for interfacing with the internal surface of the friction cup, the spherical shell having a slot for accepting the mounting post, the slot having a length sufficient to allow rotational adjustment of the cradle along a substantially vertical axis and having a width sufficiently greater than a diameter of the mounting post to allow rotational adjustment along an optical axis of the vision enhancement device; and
  a spherical washer axially mounted on the mounting post and having a partially spherical, convex surface for mating with an internal surface of the device cradle, the spherical washer constrained from axial movement toward the free end of the mounting post.

7. A mounting assembly for a vision enhancement device, the assembly comprising a display mount for holding a vision enhancement display, the display mount comprising a mechanism for translational adjustment side-to-side, one or more mechanisms for rotational adjustment along substantially horizontal and vertical axes, or a combination thereof, wherein the mechanism for translational adjustment side-to-side comprises a translating nut that converts rotation of the nut into translation of the slide.

8. A mounting assembly for a vision enhancement device, the assembly comprising a display mount for holding a vision enhancement display, the display mount comprising a mechanism for translational adjustment side-to-side, one or more mechanisms for rotational adjustment along substantially horizontal and vertical axes, or a combination thereof, wherein the mechanisms for rotational adjustment along the substantially horizontal and vertical axes comprises a set of at least three adjustable jacking screws.

* * * * *